United States Patent
Sugiyama

(10) Patent No.: US 8,482,772 B2
(45) Date of Patent: Jul. 9, 2013

(54) PRINTING APPARATUS AND PRINTING SYSTEM FOR MANAGING A PRINTING LOG

(75) Inventor: Takashi Sugiyama, Okazaki (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 586 days.

(21) Appl. No.: 12/725,897

(22) Filed: Mar. 17, 2010

(65) Prior Publication Data

US 2010/0245902 A1   Sep. 30, 2010

(30) Foreign Application Priority Data

Mar. 24, 2009   (JP) ................................ 2009-072553

(51) Int. Cl.
*G06F 3/12* (2006.01)

(52) U.S. Cl.
USPC ........................... 358/1.15; 358/1.9; 358/434

(58) Field of Classification Search
USPC ................ 358/1.1, 1.9, 1.13, 1.14, 1.15, 400, 358/401, 434
See application file for complete search history.

(56) References Cited

U.S. PATENT DOCUMENTS

| | | | |
|---|---|---|---|
| 7,580,147 B2 * | 8/2009 | Nakamura | 358/1.15 |
| 2007/0133037 A1 | 6/2007 | Arai et al. | |
| 2007/0135930 A1 | 6/2007 | Kirihara et al. | |
| 2008/0198407 A1 * | 8/2008 | Fukudome | 358/1.15 |
| 2008/0246995 A1 | 10/2008 | Mukaiyama et al. | |
| 2009/0009809 A1 | 1/2009 | Kita | |
| 2009/0027726 A1 | 1/2009 | Kajikawa | |

FOREIGN PATENT DOCUMENTS

| | | |
|---|---|---|
| CN | 1983242 A | 6/2007 |
| CN | 101246416 A | 8/2008 |
| JP | 2000-181655 A | 6/2000 |
| JP | 2000-259383 A | 9/2000 |
| JP | 2000-357147 A | 12/2000 |
| JP | 2002-163097 A | 6/2002 |
| JP | 2004-078638 A | 3/2004 |
| JP | 2004-341202 | 12/2004 |
| JP | A-2006-129063 | 5/2006 |
| JP | 2007-166176 | 6/2007 |
| JP | 2007-166177 | 6/2007 |
| JP | 2008-204001 | 9/2008 |

OTHER PUBLICATIONS

Office Action dated Nov. 2, 2011 received from the Chinese Patent Office in related Chinese Application No. 201010143189.1, together with an English-language translation.

Tadanori Mizuno, "Beginner's Course of Lectures on Network, in Which You Learn Systematically Through the Use of Illustrations, Until Data of Computer Comes Through Accurately", *Nikkei Network*, No. 39, Japan, Nikkei BP Inc., Nikkei Business Publications, Inc., Jun. 22, 2003, July Issue, p. 103.

(Continued)

*Primary Examiner* — Thomas D Lee
(74) *Attorney, Agent, or Firm* — Scully, Scott, Murphy & Presser, P.C.

(57) ABSTRACT

A multifunction printer receives a printing job. Then, the MFP acquires items of a printing log that is defined before the printing is started. For example, user name, date/time of execution, and job ID information correspond to the items of the printing log defined before the printing is started. Then, the MFP transmits at least one item of the printing log, which is defined before the printing is started, to the server before the printing is completed.

11 Claims, 10 Drawing Sheets

OTHER PUBLICATIONS

Report of Reexamination before Appeal dated Nov. 22, 2011 received from the Japanese Patent Office in related Japanese Application No. 2009-072553, together with an English-language translation.
Japanese Official Action dated Feb. 1, 2011 together with an English language translation from JP 2009-072553.
Japanese Official Action dated May 10, 2011 together with a partial English language translation from JP 2009-072553.
Extended European Search Report dated Jul. 22, 2010.
Office Action dated Apr. 25, 2012 received from the Chinese Patent Office from related Chinese Patent Application No. 201010143189.1, together with an English language translation.
Office Action dated Aug. 3, 2012 received from the Chinese Patent Office from related Chinese Patent Application No. 201010143189.1, together with an English language translation.

* cited by examiner

FIG. 4

| No. | UserName | JobName | Date | Time | Pages | Coverage |
|---|---|---|---|---|---|---|
| 01 | UserA | PrnData1.doc | 2008/12/01 | 10:25:20 | 20 | 10.32 |
| 02 | UserA | PrnData2.doc | 2008/12/01 | 10:33:32 | 1 | 8.53 |
| 03 | UserB | PrnData3.doc | 2008/12/01 | 10:47:18 | 43 | 12.11 |
| 04 | UserB | PrnData1.txt | 2008/12/01 | 13:01:49 | 134 | 21.37 |
| 05 | UserB | PrnData2.txt | 2008/12/01 | 13:15:27 | <?> | <?> |

| No. | UserName | JobName | Date | Time | Pages | Coverage |
|---|---|---|---|---|---|---|
| 01 | UserA | PrnData1.doc | 2008/12/01 | 10:25:20 | 20 | 10.32 |
| 02 | UserA | PrnData2.doc | 2008/12/01 | 10:33:32 | 1 | 8.53 |
| 03 | UserB | PrnData3.doc | 2008/12/01 | 10:47:18 | 43 | 12.11 |
| 04 | UserB | PrnData1.txt | 2008/12/01 | 13:01:49 | 134 | 21.37 |
| 05 | UserB | PrnData2.txt | 2008/12/01 | 13:15:27 | 122 | 18.97 |

210, 212

PRINTING APPARATUS AND PRINTING SYSTEM FOR MANAGING A PRINTING LOG

CROSS REFERENCE TO RELATED APPLICATION

The present application claims priority from Japanese Patent Application NO. 2009-072553, which was filed on Mar. 24, 2009, the disclosure of which is incorporated herein by reference in its entirety.

BACKGROUND OF THE INVENTION

The present invention relates to a printing apparatus and a printing system for executing a printing in response to a print request. In more detail, the present invention relates to a printing apparatus and a printing system, which are capable of managing execution histories of a printing job.

In the related art, the printing system that executes the printing in response to the print request and stores the executed result of the printing job in the external equipment as printing history information (printing log) has been proposed. For example, the related printing system that stores temporarily the printing log concerning the printing job, and then writes the printing log in the server at a timing at which no influence is exercised on the printing process is disclosed. When the user who utilizes the related printing system reads the printing log from the server, such user can grasp how the printing was done, for example, a user name and an execution time.

SUMMARY OF THE INVENTION

However, the following problems existed in the related art mentioned above. In other words, the related printing system is constructed such that the printing log is stored after the execution of the printing is completed. Therefore, the printing log is not recorded until the communication is held upon writing the printing log in the server. That is, no evidence remained in the server even though the printing was done. As a result, the user cannot grasp what type of the printing was done in answer to the printing log.

The present invention has been made to solve the problems that the above related art contains. That is, it is an object of the present invention to provide a printing apparatus and a printing system, which are capable of suppressing an omission of printing logs and managing more precisely the printing logs.

To overcome the object, the printing apparatus according to exemplary embodiments of the present invention comprises:
a printing unit which executes a printing in response to a print request;
an acquiring unit which acquires a printing log including a plurality of history items concerning the printing request, the history items including a pre-printing history item defined before the printing is completed by the printing unit; and
a transmitting unit which transmits the pre-printing history item to an external equipment before the printing is completed.

A printing system according to the exemplary embodiments of the present invention comprises a printing apparatus for executing a printing in response to a print request, and an information storing equipment connected to the printing apparatus via a network;
wherein the printing apparatus includes:
a printing unit which executes a printing in response to a print request;
an acquiring unit which acquires a printing log including a plurality of history items concerning the printing request, the history items including a pre-printing history item defined before the printing is completed by the printing unit; and
a transmitting unit which transmits the pre-printing history item to the information storing device before the printing is completed, and
the information storing device includes:
a receiving unit which receives the printing log from the printing apparatus, and
a storing which stores the printing log received by the receiving unit.

A method of controlling a printing apparatus according to the exemplary embodiments of the present invention comprises:
receiving a print request;
acquiring a printing log including a plurality of history items concerning the printing request, the history items including a pre-printing history item defined before a printing is completed;
transmitting the pre-printing history item to an external equipment before the printing is completed; and
executing the printing in response to the print request.

BRIEF DESCRIPTION OF THE DRAWINGS

FIG. 4 is a view showing an example of printing logs that are defined before a printing is started.

FIG. 5 is a view showing an example of printing logs that are defined after a printing is completed.

DESCRIPTION OF EXEMPLARY EMBODIMENTS

A printing apparatus and a printing system including the printing apparatus according to an exemplary embodiment of the present invention will be explained with reference to the accompanying drawings hereinafter. In this embodiment, the present invention is applied to a multifunction peripheral (MFP) that is equipped with a printing function and transmits the printing log to a server.

System Configuration

Figure 1:
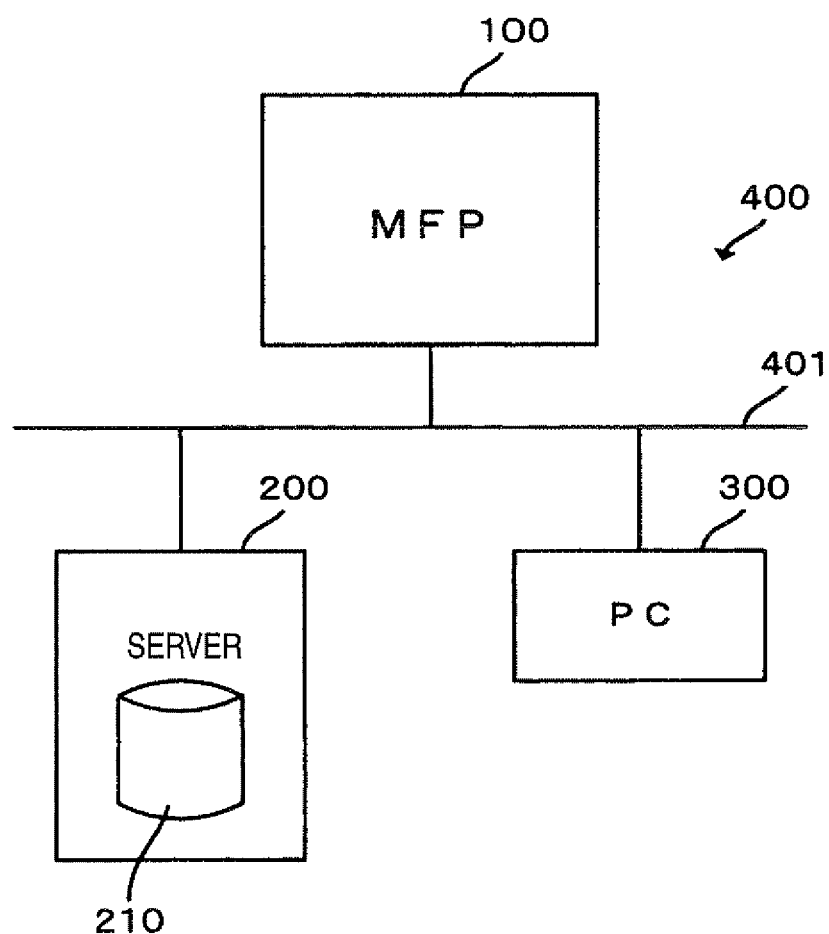
FIG. 1 is a block diagram showing a configuration of a printing system according to an embodiment of the present invention.

As shown in FIG. 1, a printing system 400 of the present embodiment includes a MFP 100 (an example of the printing apparatus), a server 200 (an example of the external equipment), and a personal computer (PC) 300. In this printing system 400, the MFP 100, the server 200, and the PC 300 are connected mutually via a network 401. Here, other devices in addition to these devices can be connected to the network 401, but their illustration is omitted for simplification of explanation.

In the printing system 400 of the present embodiment, the executed results of the printing jobs in the MFP 100 are recorded in a database 210 of the server 200 as the printing log. As the items recorded as the printing log, there are ID number of job, user name, job name, date, number of pages, amount of toner consumption, for example, and plural items are recorded in the database 210. Details of recording procedures of this printing log will be described later.

Electrical Configuration of MFP

Figure 2:
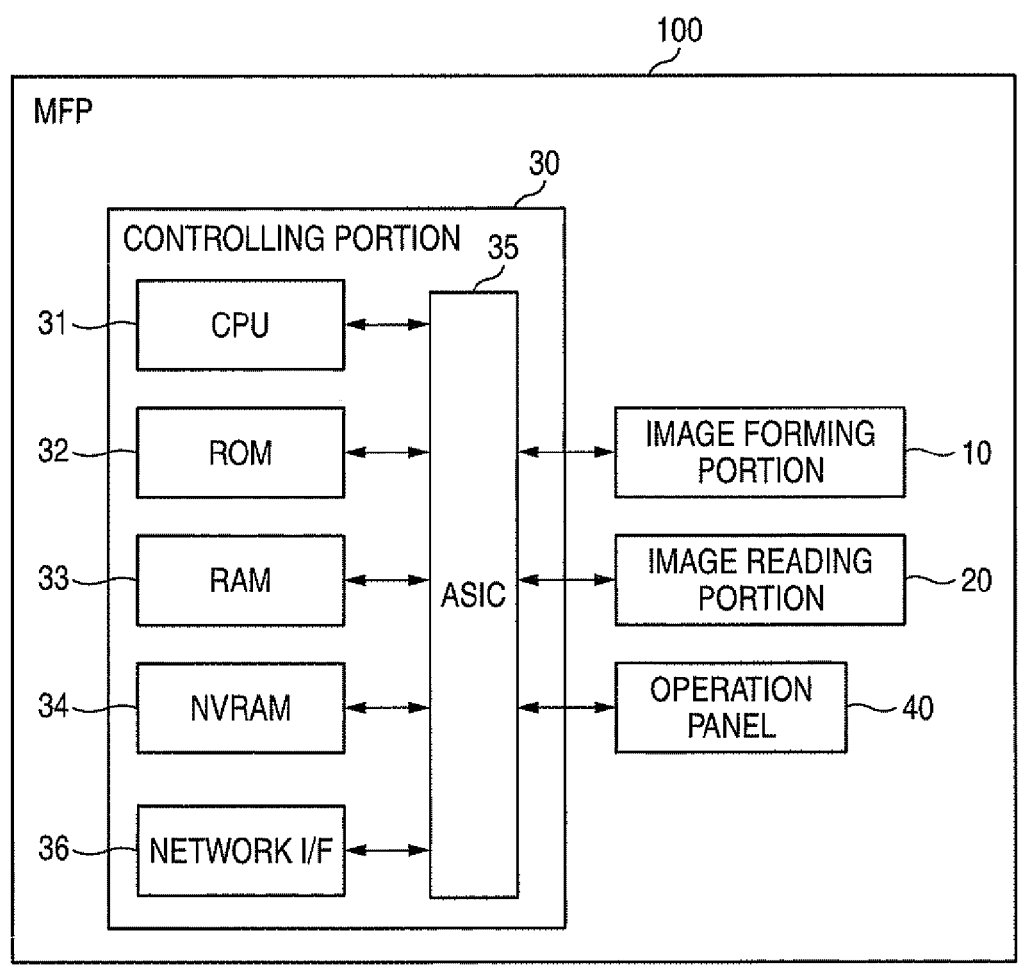
FIG. 2 is a block diagram showing an electrical configuration of a multifunction peripheral according to the embodiment.

Next, an electrical configuration of the MFP 100 will be explained hereunder. As shown in FIG. 2, the MFP 100 includes an image forming portion 10 (an example of a printing unit) for printing an image on a paper, an image reading portion 20 for reading the image on an original, an operation panel 40 composed of a liquid crystal display and a group of buttons including start key, stop key, ten-key numerical pad, etc. and a controlling portion 30 for controlling these portions. Also, the controlling portion 30 has a CPU 31, a ROM 32, a RAM 33, a NVRAM 34, an ASIC 35, and a network interface 36.

The CPU 31 executes operations to implement various functions such as an image reading function, an image forming function, etc. of the MFP 100, and acts as the center of control. Various control programs, various settings, initial values, etc. used to control the MFP 100 are stored in the ROM 32. The RAM 33 is utilized as a working area into which various control programs are read or as a memory area in which image data are stored temporarily. The NVRAM (Non Volatile RAM) 34 is a storing unit having non-volatility, and is utilized as a memory area in which various settings, image data, etc. are saved.

The CPU 31 controls various constituent elements of the MFP 100 via the ASIC 35 in compliance with the control program read from the ROM 32 and signals sent from various sensors, while storing the processed result in the RAM 33 or the NVRAM 34.

The network interface 36 is connected to the network 401, and can provide connections to the PC 300 and the server 200. Respective portions can transfer the job via the network interface 36.

Operation of Printing System

First Embodiment

Figure 3:
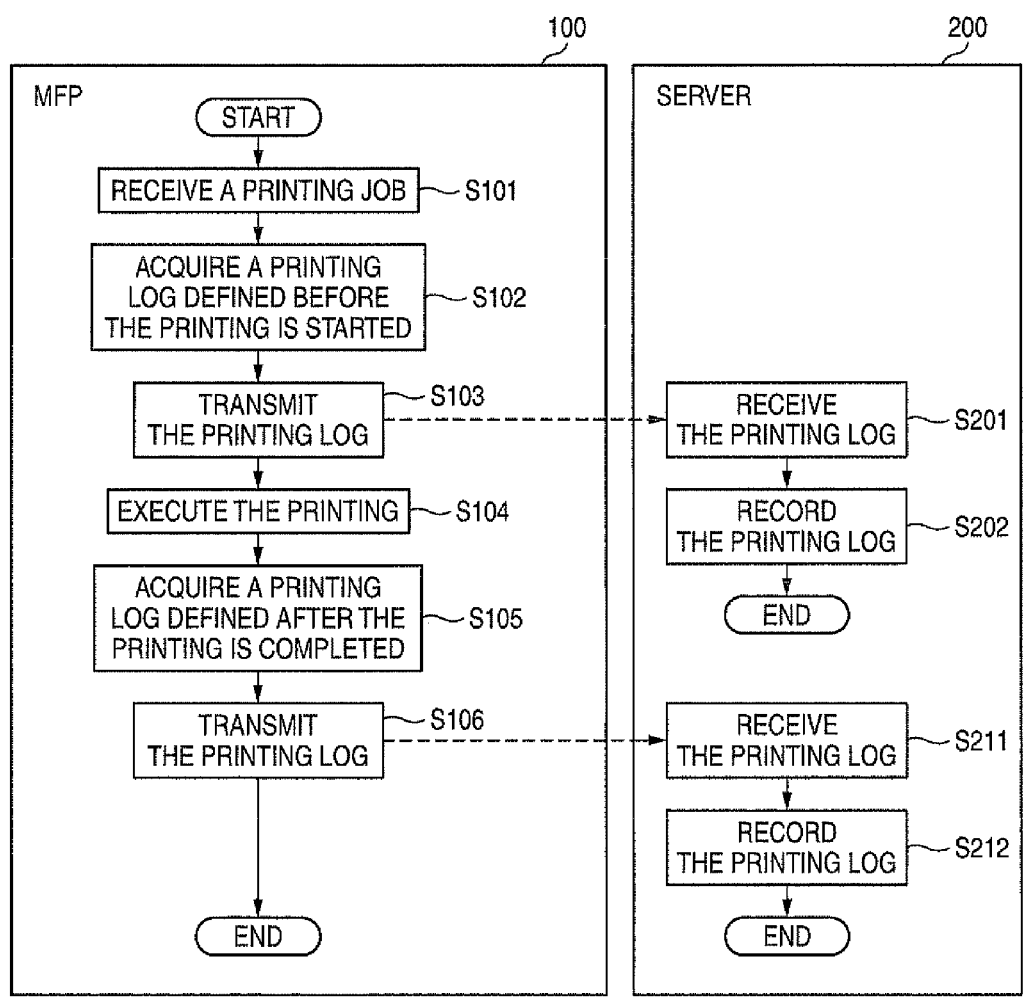
FIG. 3 is a flowchart showing procedures of a printing process according to a first embodiment.

Next, a printing process (an example of a printing unit, an acquiring unit, and a transmitting unit) of the printing system 400 will be explained with reference to a flowchart in FIG. 3 hereunder. In addition to the printing process in the MFP 100, a printing log recording process in the server 200 is contained in this printing process.

First, the MFP 100 receives a printing job (S101). The PC 300 may directly demand the printing job of the MFP 100 or may demand the printing job via the server 200, for example. Also, the printing job may be applied to the printing of the image that the image reading portion 20 read.

Then, the MFP 100 acquires items of the printing log that is defined before the printing is started (S102). For example, information used to identify the printing job corresponds to the items of the printing log that is defined before the printing is started. Concretely, the MFP 100 acquires job ID, user name, job name, and received date in this embodiment.

Then, the MFP 100 transmits the printing log acquired in S102 to the server 200 (S103). As the items of the transmitted printing log, all items acquired in S102 may be chosen or a part of them may be chosen. In S103, the MFP 100 transmits at least a part of items of the printing log to the server 200 before the printing is started.

When the printing log is transmitted, the server 200 receives the printing log (S201). Then, the server 200 records respective items of the received printing log in the database 210 (S202). At this time, as shown in FIG. 4, the records of the received printing log are added to the database 210, and information of respective items of the concerned printing log are written therein. In this case, the record of the database 210 includes the items defined before the printing is started (broken-line frame 211) and the items defined after the printing is completed (broken-line frame 212). Since the items in a broken-line frame 211 contain the items of the printing log received in S201, any information of the printing job are written in at least a part of them. In contrast, the items in a broken-line frame 212 do not contain the items of the printing log received in S201, information indicating an undefined state (in the present state, a "?" mark) is written therein.

Meanwhile, the MFP 100 starts the printing of the object job after it transmitted the printing log in S103 (S104). Then, the MFP 100 acquires the items of the printing log defined after the printing is completed (S105). For example, information used to identify the date and time of printing completion and an amount of printing correspond to the items of the printing log defined after the printing is completed. Concretely, the MFP 100 acquires the number of pages and the coverage (a rate that is occupied by the toner on a paper sheet) in this embodiment.

Then, the MFP 100 transmits the printing log acquired in S105 to the server 200 (S106). In addition to the items acquired in S105, the items, which were not transmitted to the server 200 in S103, out of the items acquired in S103 may be chosen as the items of the transmitted printing log. In other words, the items that have already been transmitted are not transmitted.

When the printing log is transmitted, the server 200 receives the printing log (S211). Then, the server 200 records the items of the received printing log in the database 210 (S212). Hence, information is written in the items that are kept undefined in the previous recording, and as a result such information as well as the previously recorded information are written in all items of the record of printing log, as shown in FIG. 5.

In other words, in the printing process in the first embodiment, the MFP 100 acquires the printing log, which includes the items specified before the printing is completed, at the time when the MFP 100 received the printing job. Then, the MFP 100 transmits at least a part of items of the acquired printing log to the server 200 before the printing is started. Then, remaining items are transmitted and are made up after the printing is completed. Because the printing log defined before this printing is started is transmitted, the evidence that the printing was done remains in the server 200 without a wait for the printing completion. Therefore, such a situation can be decreased in number that no evidence that the printing was done is left after the printing is completed. For example, even though the communication is disconnected for a while until the printing is completed after the printing log is transmitted, such a possibility becomes high that a history showing that the printing was done is left. As a result, even though a volume of print is large and it takes much time to complete the printing, it can be expected that the evidence that the printing was done is left.

Also, the MFP 100 transmits the printing log to the server 200 even after the printing is completed. That is, the MFP 100 transmits the history items that are specified after the printing is completed to the server 200. Therefore, the more adequate history management such as the management of printed real accomplishments, or the like can be performed.

In this case, start of receiving of data of the printing job, start of developing of data, start of adhering of a coloring agent on the paper, and the like correspond to the "printing start" of the present embodiment. Also, completion of adhering of the coloring agent on the paper, completion of ejecting of the paper to the outside of the apparatus, and the like correspond to the "printing completion".

Second Embodiment

Figure 6:
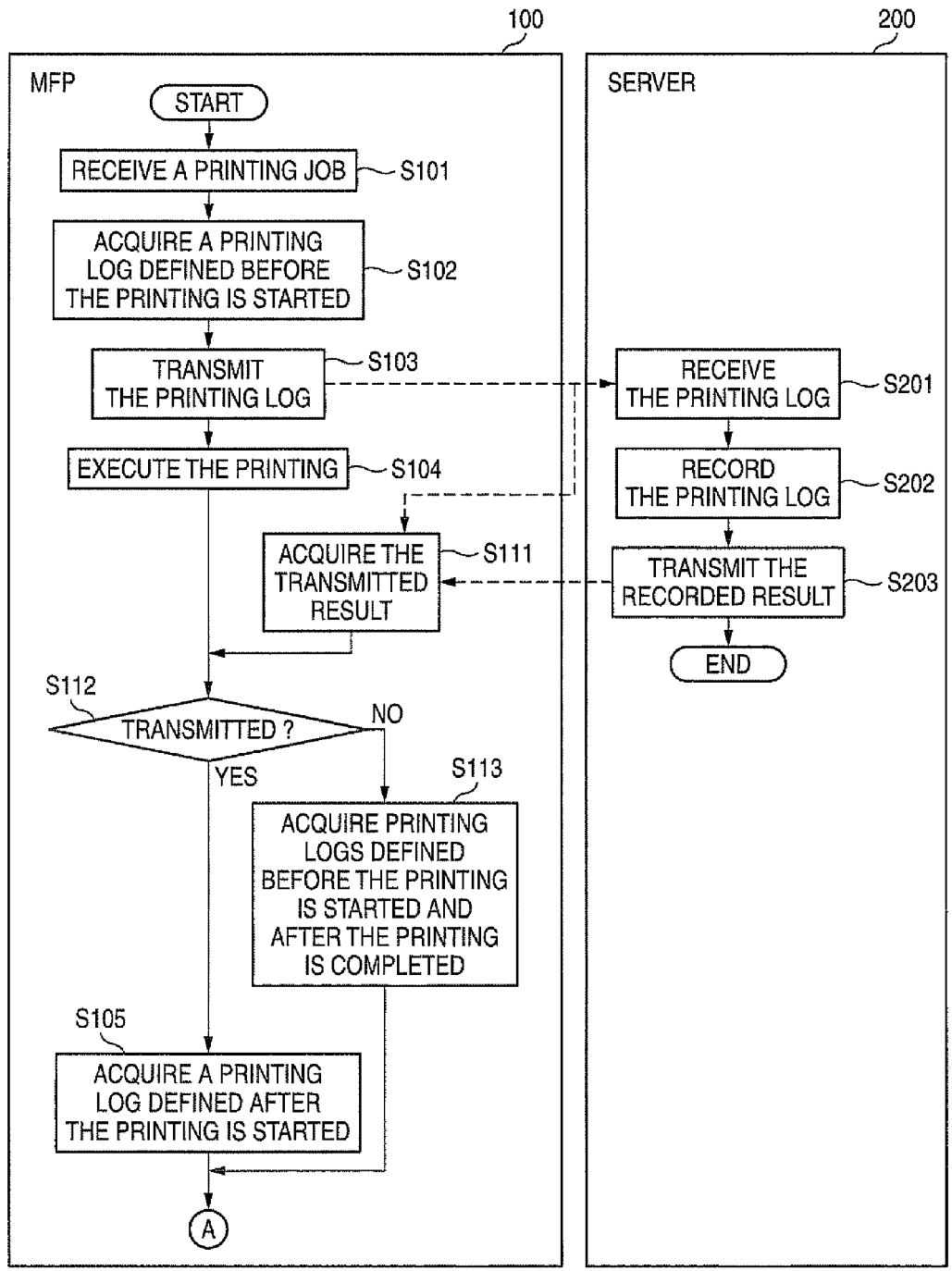
FIG. 6 is a flowchart showing procedures (former half) of a printing process according to a second embodiment.
Figure 7:
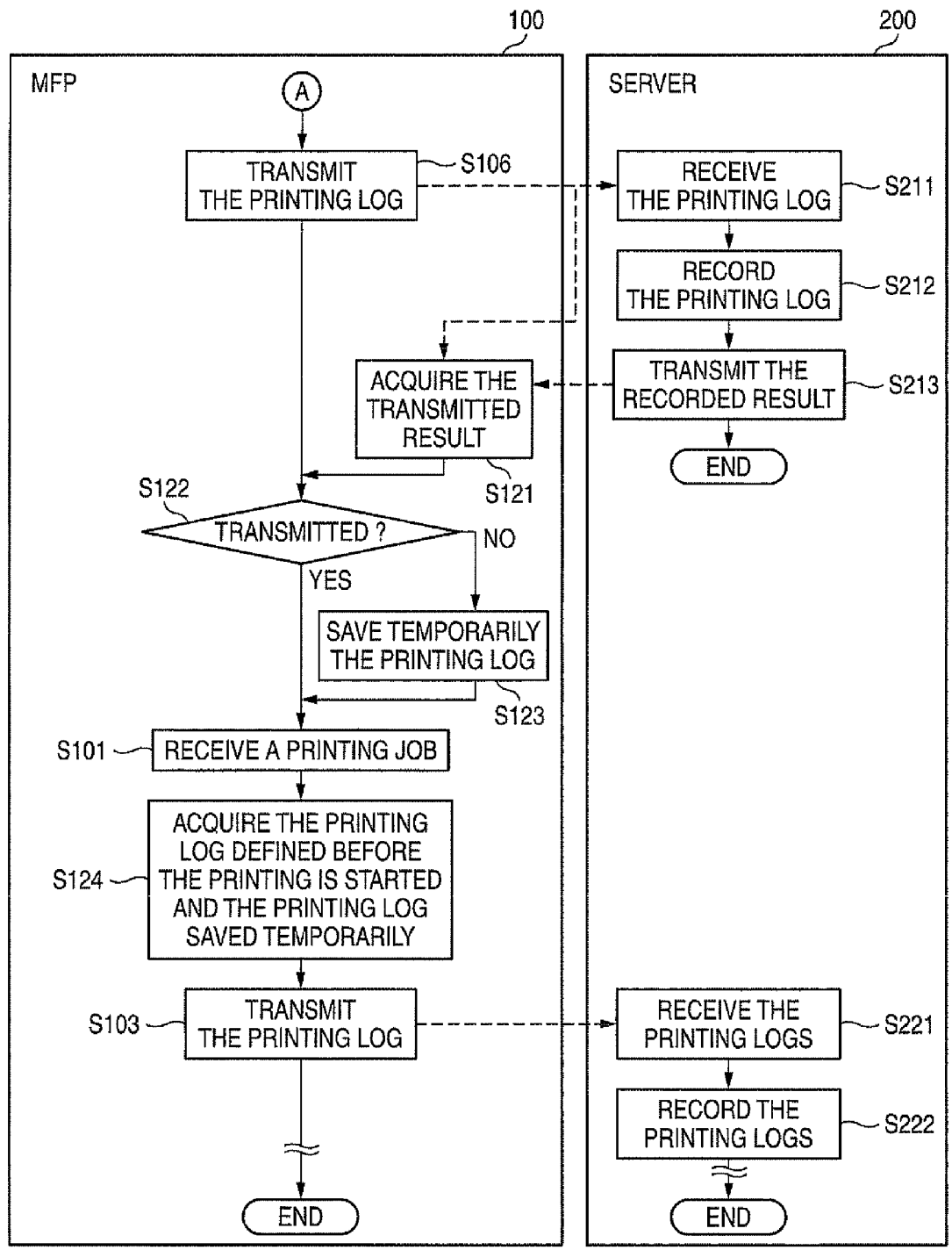
FIG. 7 is a flowchart showing procedures (latter half) of the printing process according to the second embodiment.

Next, a printing process according to a second embodiment will be explained with reference to flowcharts in FIG. 6 and FIG. 7 hereinafter. In the printing process according to the second embodiment, the items of the printing log to be transmitted next time are switched in response to the transmitted result of the printing log. Here, the similar step numbers to those in the first embodiment are affixed to the similar processes to those in the first embodiment.

First, like the first embodiment, the MFP 100 receives the printing job, and then transmits the printing log defined before the printing is started to the server 200 (S101 to S103). The MFP 100, after transmitted the printing log, starts the printing of the object job (S104). The server 200 receives the printing log (S201), and records the items of the printing log in the database 210 (S202). After the recording of the printing log is completed, the server 200 transmits the response signal of recording completion (S203).

Also, the MFP 100 acquires the transmitted result in S103 (S111) in parallel with the printing operation in S104. That is, if the recording of the printing log is completed normally in the server 200, the server 200 transmits the response signal of the recording completion in S203. The MFP 100 can receive the response signal when the recording in the server 200 is completed. In contrast, if communication is not held in the transmission in S103, the server 200 obtains an error signal such as a communication timeout, or the like. Also, if an error except communication is caused, e.g., the MFP 100 has no access right to the server 200, the user's authenticity is not accepted, the database 210 is short of a memory capacity for the added data, or the like, even though the communication is normal, the server 200 transmits the response signal in answer to each error. As a result, the MFP 100 can acquire the detailed transmitted result.

After both the printing operation in S104 and the acquiring operation of the transmitted result in S111 are completed, the MFP 100 decides whether or not the printing log acquired in S102 has been transmitted (S112). In the present embodiment, if the response signal of the recording completion is received from the server 200, the MFP 100 decides that the printing log has been transmitted.

If the printing log has been transmitted (S112: YES), the MFP 100 acquires the items of the printing log defined after the printing is completed (S105). Then, the MFP 100 transmits the items of the acquired printing log together with the items being not transmitted yet in S103 to the server 200 (S106). In contrast, if the printing log has not been transmitted (S112: NO), the MFP 100 acquires together the printing log defined after the printing is completed and the printing log defined before the printing is started (S113). Then, the MFP 100 transmits all information of both printing logs to the server 200 (S106). That is, the items of the printing log transmitted in S103 are transmitted once again.

The server 200 receives the printing log (S211), and then records respective items of the received printing log in the database 210 (S212). At this time, when the items that were not recorded by the transmission of the printing log before the printing is started are contained, the items that were not recorded are recorded at a timing at which the items of the printing log defined after the printing is completed are recorded. After the recording of the printing log is completed, the server 200 transmits the response signal of the recording completion (S213).

Also, the MFP 100 acquires the transmitted result in S106 (S121). In S121, like S111, the MFP 100 can acquire the detailed transmitted result. In this case, the MFP 100 goes to a standby state until it acquires the transmitted result.

After the acquisition of the transmitted result in S121 is ended, the MFP 100 decides whether or not the printing log acquired in S106 has been transmitted (S122). If the printing log has been transmitted (S122: YES), the MFP 100 stands by until it receives the next printing job. In contrast, if the printing log has not been transmitted (S122: NO), the MFP 100 saves temporarily respective items of the printing log transmitted in S106 in the NVRAM 34 (S123). Then, the MFP 100 stands by until it receives the next printing job.

Then, the MFP 100 receives the next printing job (referred to as the "present printing job" hereinafter, and the printing job received precedingly is referred to as the "preceding printing job" hereinafter) (S101). Then, the MFP 100 acquires the printing log of the present printing job defined before the printing is started and the printing log of the preceding printing job saved in S123 (S124). Then, the MFP 100 transmits the printing log acquired in S124 to the server 200 (S103). That is, the MFP 100 transmits both the printing log of the present printing job and the printing log of the preceding printing job.

The server 200 receives the printing logs (S221), and then records respective items of the received printing logs in the database 210 (S222). That is, the printing log of the preceding printing job, which could not be recorded by the transmission of the printing log after the printing is completed, can be recorded at a timing at which the printing log of the present printing job is recorded.

In other words, in the printing process in the second embodiment, it is decided whether or not the printing log has been transmitted and then, if it is decided that the printing log has not been transmitted, the items of the printing log that has not been transmitted are retransmitted at a transmission timing of the next printing log. That is, the recovery of the items of the printing log is made possible. As a result, omission of the items of the printing log can be reduced, and the history management can be performed more safely.

Third Embodiment

Figure 8:
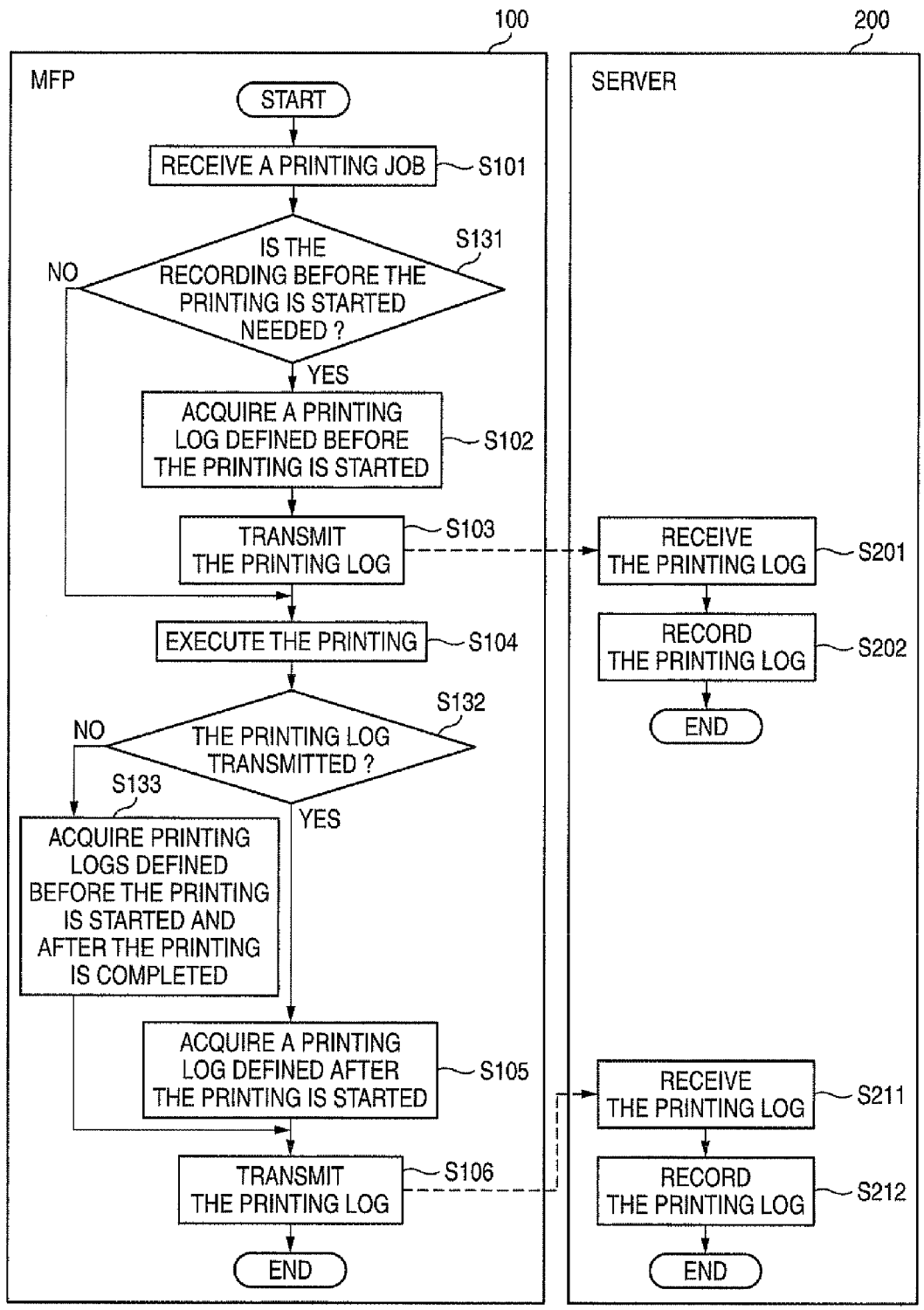
FIG. 8 is a flowchart showing procedures of a printing process according to a third embodiment.

Next, a printing process according to a third embodiment will be explained with reference to a flowchart in FIG. 8 hereunder. In the printing process according to the third embodiment, it is switched, if necessary, whether or not the transmission of the printing log before the printing is started should be made. Here, the similar step numbers to those in the first embodiment are affixed to the similar processes to those in the first embodiment.

First, the MFP 100 receives the printing job (S101), and then decides whether or not the recording of the printing log before the printing is started should be needed (S131). The necessity of the recording of the printing log is decided based on an attribute of the printing job or a stability of the network, for example.

When the decision is made based on an attribute of the printing job, user, printing settings, and the like correspond to the attribute as the measure of decision. For example, the user who does not need the recording of the printing log decides that the recording of the printing log before the printing is started is not needed. Also, for example, only in the case of color setting, the user may decide that the recording of the printing log before the printing is started is needed.

Also, when the stability of the network is employed as the measure of decision, a degree of the stability of the network can be decided based on the number of times the printing apparatus succeeded successively in holding communication with the external equipment, an elapsed time from a time of the last failure, a periodical communication diagnosis (ping command in TCP/IP, or the like), or the like, for example. Also, when the connection to the server 200 is established via radio communication, a field intensity may be measured.

If it is decided that the recording of the printing log before the printing is started is needed (S131: YES), the MFP 100 acquires the printing log defined before the printing is started (S102). Then, the MFP 100 transmits at least a part of the items of the printing log to the server 200 (S103). Then, the MFP 100 starts the printing of the object job (S104). In contrast, if it is decided that the recording of the printing log before the printing is started is not needed (S131: NO), the MFP 100 starts immediately the printing of the object job not to execute S102 and S103 (S104).

Then, the MFP 100 decides whether or not the printing log has been transmitted before the printing is started, after the printing is completed (S132). If the printing log has been transmitted (S132: YES), the MFP 100 acquires the items of the printing log defined after the printing is completed (S105). Then, the MFP 100 transmits the items of the acquired printing log together with the items being not defined in S103 to the server 200 (S106). In contrast, if the printing log has not been transmitted (S132: NO), the MFP 100 acquires both the items of the printing log defined after the printing is completed and the items of the printing log defined before the printing is started (S133). Then, the MFP 100 transmits all information of both printing logs to the server 200 (S106).

In other words, in the printing process in the third embodiment, it is decided whether or not the recording of the printing log in the stage prior to start of the printing should be needed and then, if it is decided that the recording of the printing log is not needed, the printing is started not to execute the transmission of the printing log. Therefore, a flexibility of operation is increased. For example, when the printing job does not need the strict management of history, in some cases the ex post facto transmission of the printing log made may be enough, even if the printing log is not transmitted on purpose in advance of the printing job. As a result, the load on the network 401 can be lessened by reducing the number of times the printing apparatus communicates with the server 200.

Fourth Embodiment

Figure 9:
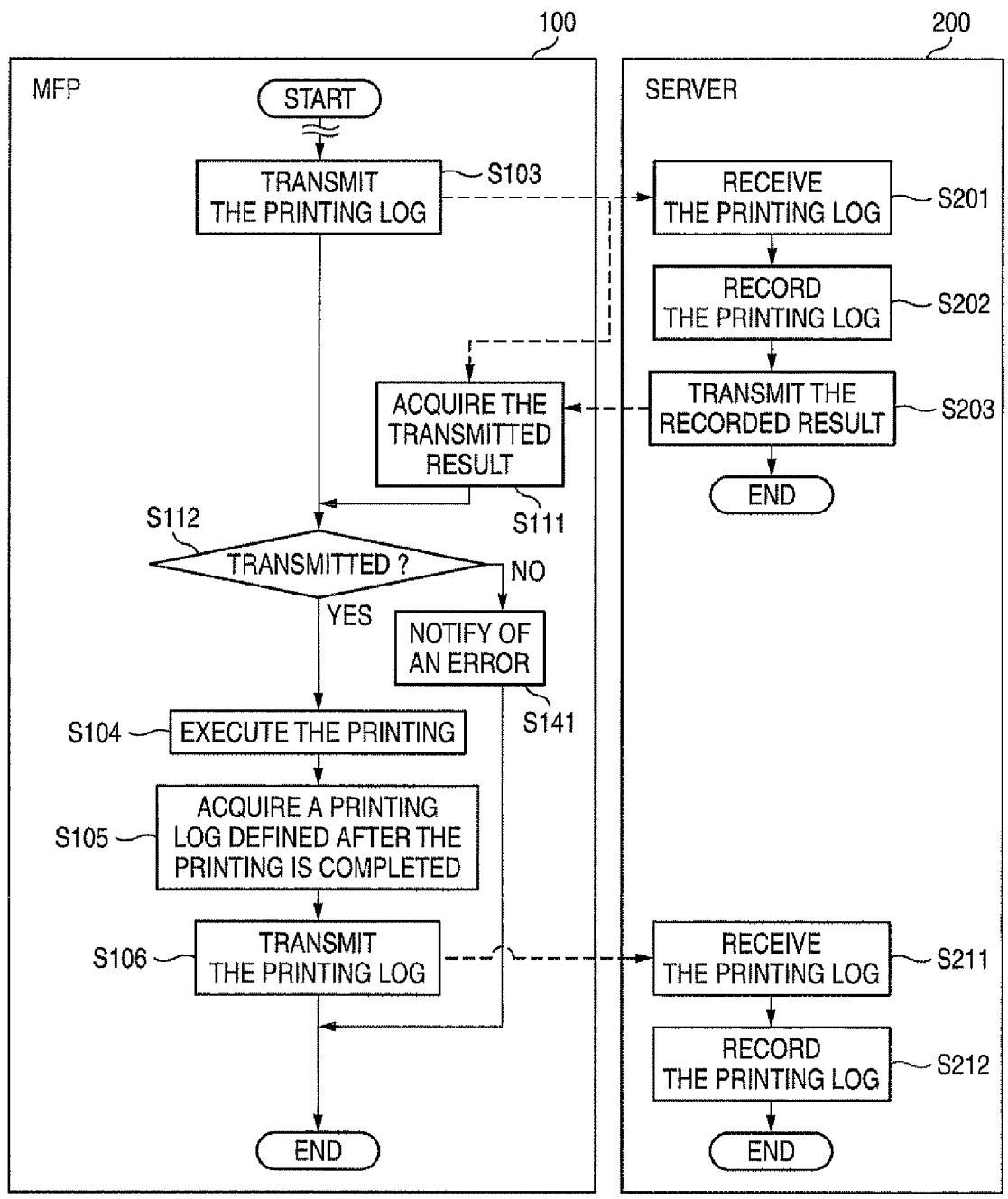
FIG. 9 is a flowchart showing procedures of a printing process according to a fourth embodiment.

Next, a printing process according to a fourth embodiment will be explained with reference to a flowchart in FIG. 9 hereunder. In the printing process according to the fourth embodiment, it is switched whether or not the printing process should be executed, in response to the transmitted result of the printing log before the printing is started. Here, the similar step numbers to those in the first embodiment are affixed to the similar processes to those in the first embodiment.

First, like the first embodiment, the MFP 100 receives the printing job, and then transmits the printing log defined prior to the printing to the server 200 (S101 to S103). Then, the MFP 100 stands by until it obtained the transmitted result after it transmitted the printing log. The acquisition of the transmitted result in Sill is similar to the second embodiment.

When the MFP 100 acquires the transmitted result in S103 (S111), it decides whether or not the printing log has been transmitted (S112). If the printing log has been transmitted (S112: YES), the MFP 100 starts the printing (S104). Then, the MFP 100 acquires the items of the printing log defined after the printing is completed (S105). Then, the MFP 100 transmits the items of the acquired printing log together with the items of the printing log not transmitted yet in S103 to the server 200 (S106).

In contrast, if the printing log has not been transmitted (S112: NO), the MFP 100 notifies of an error (S141). As a notifying mode of the error, for example, an error message is displayed on a liquid crystal display of the operation panel 40. In addition, an error signal may be transmitted to the PC that transmitted the printing job. After the MFP 100 notified the error, the process is ended not to do the printing.

In other words, in the printing process of the fourth embodiment, the MFP 100 acquires the transmitted result obtained before the printing is started, and then decides whether or not the printing should be done, based on that transmitted result. Such a possibility is high that, when the printing log cannot be written before the printing is started, the printing log cannot be written even after the printing is completed. As a result, since the printing is started only after the transmitted result is received, it is feasible to avoid the printing that would be done in such a situation that it is highly possible that the evidence showing that the printing was done does not remain.

For example, in the case of the system that the charge for printing is decided in response to a volume of printing, when the printing is started in such a situation that no printing log can be left, it is difficult to charge a fee for the printing job. In the present embodiment, the printing that would be done in such a situation that it is highly possible that no printing log can be left can be avoided, and as a result such a situation that it is impossible to charge a fee for the printing job can be reduced.

Fifth Embodiment

Figure 10:
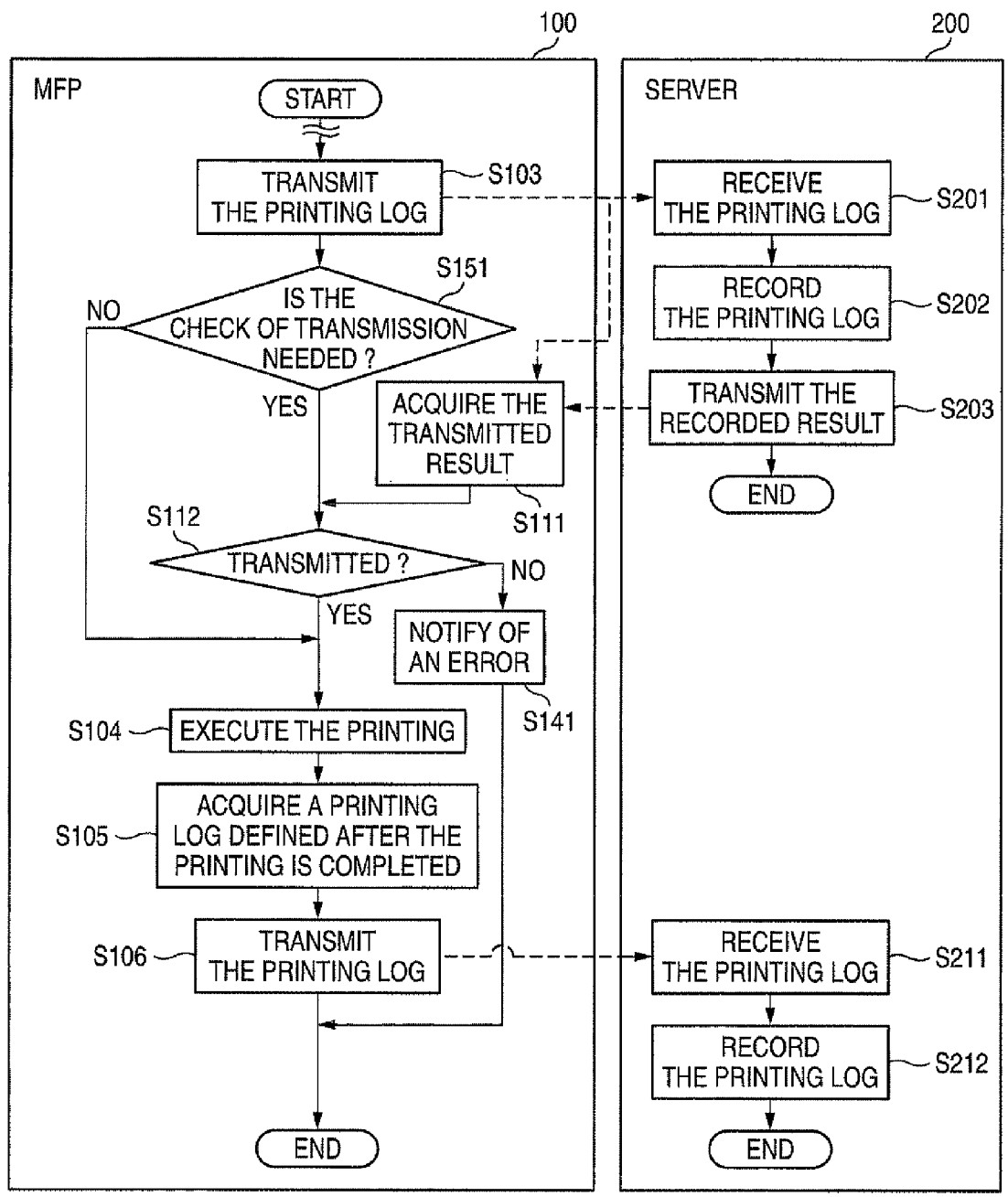
FIG. 10 is a flowchart showing procedures of a printing process according to a fifth embodiment.

Next, a printing process according to a fifth embodiment will be explained with reference to a flowchart in FIG. 10 hereunder. In the printing process according to the fifth embodiment, it is switched, if necessary, whether or not the transmission of the printing log before the printing is started should be checked. In this respect, the fifth embodiment is different from the fourth embodiment in which the transmission of the printing log before the printing is started is always checked. Here, the similar step numbers to those in the fourth embodiment are affixed to the similar processes to those in the first embodiment.

First, like the first embodiment, the MFP 100 receives the printing job, and then transmits at least a part of items of the printing log defined prior to the printing to the server 200 (S101 to S103). Then, the MFP 100 decides whether or not the transmission check of the printing log defined before the printing is started should be needed (S151). The necessity of checking such transmission is decided depending upon the attribute of the printing job, for example.

If the transmission check is needed (S151: YES), the MFP 100 stands by until it acquires the transmitted result. Then, when the MFP 100 acquires the transmitted result (S111), it decides whether or not the printing log has been transmitted (S112). If the printing log has been transmitted (S112: YES), the MFP 100 causes to start the printing (S104). Then, the MFP 100 acquires the items of the printing log defined after the printing is completed (S105). Then, the MFP 100 transmits the acquired printing log together with the items of the printing log not transmitted in S103 to the server 200 (S106). In contrast, if the printing log has not been transmitted (S112: NO), the MFP 100 notifies of an error (S141). Then, the process is ended not to do the printing.

In contrast, if the transmission check is not needed (S151: NO), the MFP 100 executes the printing without a wait for the acquisition of the transmitted result (S104). Then, the MFP 100 acquires the items of the printing log defined after the printing is completed. Then, the MFP 100 transmits the acquired printing log together with the items of the printing log not transmitted in S103 to the server 200 (S106).

In other words, in the printing process in the fifth embodiment, it is decided whether or not the transmission check of the printing log is needed in the stage before the printing is started, and then, if yes, it is decided whether or not the printing should be done after the transmitted result is acquired. Since the transmission check of the printing log needs a time to acquire the transmitted result, a reduction of throughput is brought about. For this reason, only when the transmission check is needed, the start of the printing job is suspended until the transmitted result is acquired. As a result, it can be expected that a reduction of throughput can be suppressed to the lowest minimum.

In this case, the present embodiment gives a mere illustration, and is not limit the present invention at all. Accordingly, various improvements and variations can be of course applied to the present invention within a scope that does not depart from its gist. For example, the present invention can be applied to not only the multifunction peripheral (MFP) but also a copying apparatus, a printer, and the like, which are equipped with a printing function. Also, either of the electro-photography system and the ink jet system may be employed as the image forming system of the image forming portion. Also, either the present invention may be used to form the color image or the present invention may be used exclusively to form the monochromatic image. Also, in the present embodiment, the printing log is recorded in the server, but the present invention is not limited to this embodiment. For example, recorded log may be recorded in the PC or the mobile information terminal.

Also, in the first embodiment, the items of the printing log are transmitted before the printing in the MFP 100 is started. But the items of the printing log are not always transmitted before the printing is started. That is, any timing before the printing in the MFP 100 is completed may be employed, and thus the timing before the printing is started or during the printing process may be employed, for example.

What is claimed is:

1. A printing apparatus comprising:
   a printing unit which executes a printing in response to a print request; and
   a controller configured to:
   acquire a printing log including a plurality of history items concerning the printing request, the history items including a pre-printing history item defined before the printing is completed by the printing unit, and
   transmit the pre-printing history item to an external equipment before the printing is completed, and
   allow the printing unit to execute the printing in response to the print request before receiving a response signal indicating that recording the transmitted pre-printing history item into the external equipment is completed,
   wherein the pre-printing history item does not change after the printing is completed, and
   if the transmitted pre-printing history item is received by the external equipment, the controller transmits a post-printing history item to the external equipment after the printing is completed, and
   if the transmitted pre-printing history item is not received by the external equipment, the controller transmits the pre-printing history item together with the post-printing history item to the external equipment.

2. The printing apparatus according to claim 1, wherein the history items includes a post-printing history item which is defined after the printing is completed.

3. The printing apparatus according to claim 2, wherein the controller does not transmit the pre-printing item after the printing is completed.

4. The printing apparatus according to claim 2, wherein the controller decides whether or not the pre-printing history item transmitted before the printing is completed has been transmitted to the external equipment, and
   when the controller decides that the pre-printing history item has not been transmitted, the controller retransmits the pre-printing history item at a time when the history items are transmitted after the printing is completed.

5. The printing apparatus according to claim 2, further comprising:
   a storing unit which decides whether or not the post-printing history item has been transmitted to the external equipment, and stores the post-printing history item that has not been transmitted when the storing unit decides that the history items has not been transmitted;
   wherein the controller retransmits the post-printing history items stored in the storing unit at a time when the history items are transmitted before the printing is completed.

6. The printing apparatus according to claim 1, wherein the printing unit starts the printing when the pre-printing history item has been transmitted to the external equipment, and does not start the printing when the pre-printing history item has not been transmitted.

7. The printing apparatus according to claim 6, wherein whether or not a decision regarding whether or not the pre-printing history item has been transmitted is made is switched in response to an attribute of a printing job whose printing is requested.

8. The printing apparatus according to claim 1, wherein whether or not the pre-printing history item is to be transmitted is switched in response to an attribute of a printing job whose printing is requested.

9. The printing apparatus according to claim 1, wherein whether or not the pre-printing history item is to be transmitted is switched in response to stability of communication with the external equipment.

10. A printing system comprising a printing apparatus for executing a printing in response to a print request, and an information storing device connected to the printing apparatus via a network;
    wherein the printing apparatus includes:
    a printing unit which executes a printing in response to a print request; and
    a controller configured to:
    acquire a printing log including a plurality of history items concerning the printing request, the history items including a pre-printing history item defined before the printing is completed by the printing unit,
    transmit the pre-printing history item to the information storing device before the printing is completed, and allow the printing unit to execute the printing in response to the print request before receiving a response signal indicating that recording the transmitted pre-printing history item into the external equipment is completed; and the information storing device includes:
- a receiving unit which receives the printing log from the printing apparatus, and
- a storing unit which stores the printing log received by the receiving unit, wherein the pre-printing history item does not change after the printing is completed, and if the transmitted pre-printing history item is received by the information storing device, the controller transmits a post-printing history item to the information storing device after the printing is completed, and if the transmitted pre-printing history item is not received by the information storing device, the controller transmits the pre-printing history item together with the post-printing history item to the information storing device.

11. A method of controlling a printing apparatus, the method comprising:

receiving, by the printing apparatus, a print request;

acquiring, by the printing apparatus, a printing log including a plurality of history items concerning the printing request, the history items including a pre-printing history item defined before a printing is completed;

transmitting, by the printing apparatus, the pre-printing history item to an external equipment before the printing is completed;

executing, by the printing apparatus, the printing in response to the print request; and executing the printing in response to the print request before receiving a response signal indicating that recording the transmitted pre-printing history item into the external equipment is completed, wherein the pre-printing history item does not change after the printing is completed, and if the transmitted pre-printing history item is received by the external equipment, transmitting a post-printing history item to the external equipment after the printing is completed, and if the transmitted pre-printing history item is not received by the external equipment, transmitting the pre-printing history item together with the post-printing history item to the external equipment.

* * * * *